(12) United States Patent
Ogawa

(10) Patent No.: US 6,929,045 B1
(45) Date of Patent: Aug. 16, 2005

(54) PNEUMATIC RADIAL TIRES

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/370,981

(22) Filed: Aug. 10, 1999

(30) Foreign Application Priority Data

Sep. 1, 1998 (JP) ................................. 10-246820

(51) Int. Cl.$^7$ ........................ B60C 15/00; B60C 15/05
(52) U.S. Cl. .................... 152/539; 152/540; 152/545; 152/552
(58) Field of Search ................ 152/539, 545, 152/552, 553, 540

(56) References Cited

U.S. PATENT DOCUMENTS 3,815,652 A * 6/1974 Pouilloux ................. 152/542

FOREIGN PATENT DOCUMENTS

| DE | 2408474 | * | 8/1975 |
| EP | 0583615 | * | 2/1994 |
| EP | 0 664 231 A1 | | 7/1995 |
| EP | 0 778 161 A1 | | 6/1997 |
| GB | 172 784 A | | 12/1921 |
| GB | 393 312 A | | 6/1933 |
| GB | 2 179 009 A | | 2/1987 |
| JP | 3-243404 | * | 10/1991 |
| JP | 6-171306 | | 6/1994 |
| JP | 06-191238 | * | 7/1994 |
| JP | 06191238 | * | 7/1994 |
| JP | 9-155991 | | 6/1997 |
| JP | 9-315108 | | 12/1997 |

* cited by examiner

*Primary Examiner*—Jeff H. Aftergut
*Assistant Examiner*—Justin Fischer
(74) *Attorney, Agent, or Firm*—Oliff & Berridge, PLC

(57) ABSTRACT

A pneumatic radial tire comprises a radial carcass extending between a pair of bead portions each including two bead cores therein and reinforcing a pair of sidewall portions and a tread portion, wherein the radial carcass is comprised of a rubberized ply of a continuous cord successively repeating round trip in at least one of the two bead cores as a pair between the pair of the bead portions along a circumference of the bead portion and a roundtrip return portion of the cord is existent in both the bead portions. In this case, at least one of the two bead cores has such a structure that one or more steel wires are arranged lengthwise and widthwise in radial and widthwise directions of the tire, and the cord of the carcass ply has a roundtrip return portion located through a side face of the bead core having the above structure so as to cover at least an innermost steel wire arrangement in the radial direction from an inner side in the radial direction of the tire.

4 Claims, 9 Drawing Sheets

PNEUMATIC RADIAL TIRES

BACKGROUND OF THE INVENTION

1. Field of the Invention

This invention relates to a pneumatic radial tire, and more particularly to a pneumatic radial tire wherein a carcass ply cord is a continuous cord successively repeating roundtrip between a pair of bead portions in a circumferential direction of the tire. Particularly, the invention relates to a pneumatic radial tire capable of conducting automatic building in the production of an uncured tire and having an excellent bead portion durability.

2. Description of Related Art

In the carcass ply of the general-purpose pneumatic radial tire, it is well-known that organic fiber cords such as nylon cord, polyester cord and the like or inorganic fiber cords such as carbon fiber cord, steel cord and the like are used as a reinforcing member for a pair of bead portions, a pair of sidewall portions and a tread portion.

The carcass ply comprised of a radial arrangement of the above cords has a turnup portion wound around a bead core embedded in the bead portion from an inside of the tire toward an outside thereof, wherein cut ends of the cords are located in an upper end of the turnup portion. During the running of the tire having such a radial carcass ply under loading, a large shearing strain is applied to the cord cut end of the turnup portion and hence the upper end part of the turnup portion results in the occurrence of separation failure.

On the other hand, the tire having the above carcass ply structure requires man power in the building of an uncured tire, which is out of the trend for labor saving and power saving and obstructs the building automation toward a near future.

At present, there are proposed pneumatic radial tires having a carcass ply structure suitable for automatic building wherein cut ends of the cords are not formed in the upper end of the turnup portion, or tire production methods suitable for automatic building. For example, JP-A-6-171306 proposes a carcass fixing method wherein a cord of a radial carcass ply is a round trip arrangement of a continuous cord extending between a pair of bead portions and a return portion of the round trip cord is interposed from both sides thereof in an axial direction of the tire between a pair of bead cores through hard rubber layers having a Shore A hardness of not less than 70.

And also, JP-A-9-155991 is concerned with the same method of producing a pneumatic radial tire as in the above publication in a point that the cord of the radial carcass ply is a round trip arrangement of a continuous cord extending between a pair of bead portions, but proposes a method wherein a return portion of a round trip cord is wound each bead core between a pair of bead cores from an inside of the tire toward an outside thereof in the radial direction likewise the conventional tire and the bead core is constructed with cords as well as a tire manufactured by this method.

According to the methods proposed by the above two publications, the automatic building is certainly facilitated, and the resulting pneumatic tires are superior to the conventional tire in a point that cut ends of the carcass ply cords are not existent in the bead portion.

In the pneumatic tire proposed in the former publication, however, since the return portion of the round trip cord is merely anchored in the bead core through the hard rubber, a phenomenon of pulling out the carcass ply cord from the bead core is caused as the running of the tire proceeds under an inflation of an internal pressure and hence a sufficient bead portion durability can not be obtained.

On the other hand, in the pneumatic tire proposed in the latter publication, the roundtrip return portion of the carcass ply cord forms a turnup portion around the bead core, so that the above inconvenience of the former publication may be improved to a certain extent, but since the bead core is constructed with the cords or twisted wires and a single bead core is used in each bead portion, the elongation is large along a circumference of the bead portion and the bead portion stiffness is lack and hence the development of the phenomenon of pulling out the carcass ply cord is accompanied and there is still left a problem that the bead portion durability is lacking.

SUMMARY OF THE INVENTION

It is, therefore, an object of the invention to provide a pneumatic radial tire having a carcass structure capable of easily conducting automatic building of an uncured tire, and controlling a pulling-out phenomenon of a carcass ply cord and sufficiently ensuring a strength and rigidity required for a bead portion to provide an excellent bead portion durability.

According to the invention, there is the provision of a pneumatic radial tire comprising a radial carcass extending between a pair of bead portions each including two bead cores therein and reinforcing a pair of sidewall portions and a tread portion, wherein the radial carcass is comprised of a rubberized ply of a continuous cord successively repeating round trip in at least one of the two bead cores as a pair between the pair of the bead portions along a circumference of the bead portion and a roundtrip return portion of the cord is existent in both the bead portions, characterized in that at least one of the two bead cores has such a structure that one or more steel wires are arranged lengthwise and widthwise in radial and widthwise directions of the tire, and the cord of the carcass ply has a roundtrip return portion located through a side face of the bead core having the above structure so as to cover at least an innermost steel wire arrangement in the radial direction from an inner side in the radial direction of the tire.

In a preferable embodiment of the invention, the two bead cores in each bead portion are arranged adjacent to each other in a widthwise direction of the tire and the roundtrip return portion of the carcass ply cord is sandwiched between the two bead cores. In this case, it is favorable that the roundtrip return portion of the carcass ply cord extends from an inside of the tire toward an outside thereof in the widthwise direction along an inner circumference of the innermost steel wire arrangement of the bead core in the radial direction.

In another preferable embodiment of the invention, the roundtrip return portion of the carcass ply cord has a terminal part extending along an outer side face of a bead core located outside in the widthwise direction of the tire.

In the other preferable embodiment of the invention, the roundtrip return portion of the carcass ply cord extends from an outside of the tire toward an inside thereof in the widthwise direction of the tire along an inner circumference of the innermost steel wire arrangement of the bead core.

In a further preferable embodiment of the invention, the two bead cores in each bead portion are arranged adjacent to each other and a bead core of the two bead cores located at an inside of the tire has the above innermost steel wire arrangement and the roundtrip return portion of the carcass ply cord extends along an inner side face of such a bead core.

In this case, it is favorable that the roundtrip return portion of the carcass ply cord has a terminal part wound around the bead core having the innermost steel wire arrangement from an inside of the tire toward an outside thereon in the radial direction.

In a still further preferable embodiment of the invention, the roundtrip return portion of the carcass ply cord has a single terminal part aligned at a given pitch along the circumference of the bead portion or multiple terminal parts overlapped with each other at a given pitch along the circumference of the bead portion.

BRIEF DESCRIPTION OF THE DRAWINGS

The invention will be described with reference to the accompanying drawings, wherein.

DESCRIPTION OF PREFERRED EMBODIMENTS

Figure 1:
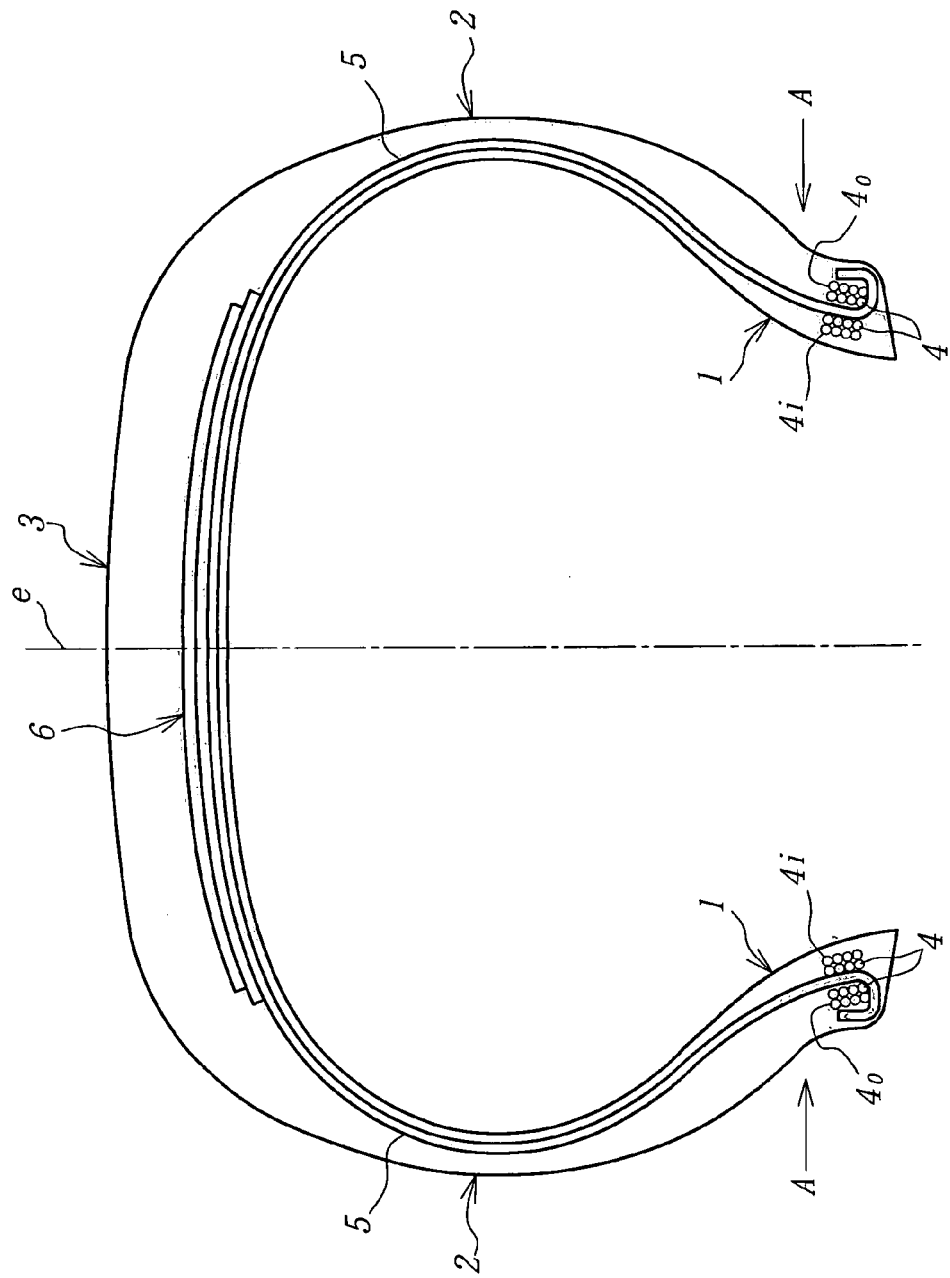
FIG. 1 is a diagrammatically section view of a first embodiment of the pneumatic radial tire according to the invention.

In FIG. 1 is shown a first embodiment of the pneumatic radial tire according to the invention, which comprises a pair of bead portions 1, a pair of sidewall portions 2, a tread portion 3 connecting the sidewall portions 2, and a radial carcass 5 extending between the pair of the bead portions 1 including two bead cores 4 therein and reinforcing the bead portions 1, sidewall portions 2 and tread portion 3. A belt 6 reinforcing the tread portion 3 is disposed on an outer circumference of the radial carcass 5 according to the custom. The two bead cores 4 are inner bead core 4i and outer bead core 4o arranged adjacent to each other in the widthwise direction of the tire. In FIG. 1, symbol e is an equatorial plane of the tire.

Figure 2:
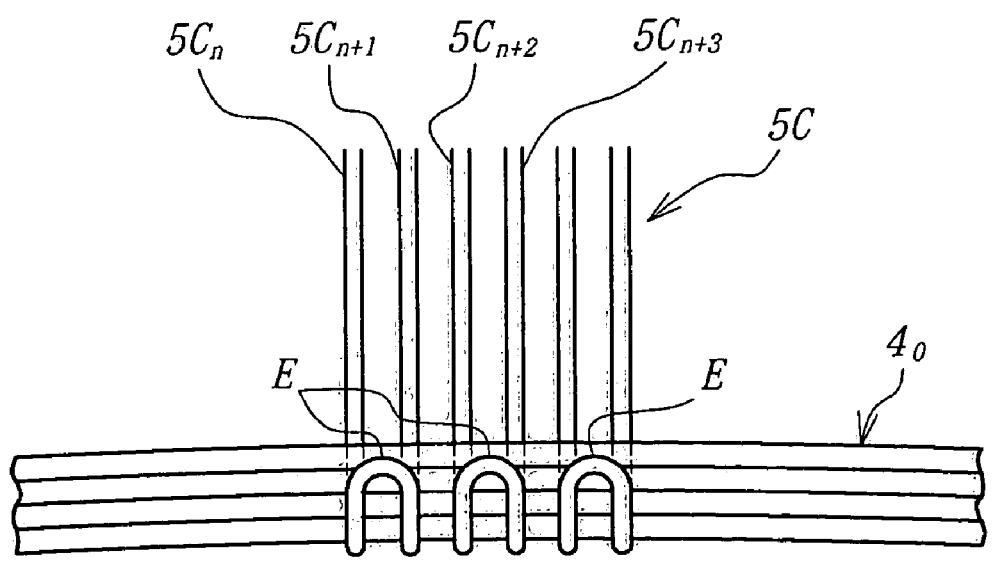
FIG. 2 is a side view of a main part seen through from a direction of an arrow A in FIG. 1.

The radial carcass 5 is comprised of one or more rubberized plies having a radial cord arrangement (one ply in the illustrated embodiment). As shown in FIG. 2, a ply cord 5C of the radial carcass 5 is one or more continuous cords (one cord in the embodiment of FIG. 2), for example, an inorganic continuous fiber cord such as steel cord or the like, or an organic continuous fiber cord such as polyester cord, nylon cord, rayon cord or the like.

In this case, the continuous cord successively repeats round trip in at least one of the two bead cores 4 as a pair (between the bead cores 4i, 4o in the illustrated embodiment) along a circumference of the bead portion 1, and a terminal part of the ply cord 5C of the carcass 5 is arranged so as to cover at least an inside of either one of the two bead cores 4i, 4o in the bead portion 1 in the radial direction of the tire.

In FIG. 2 is shown a side view illustrating the ply cord 5C of the carcass 5 and the bead core 4 (outer bead core 4o) seen through from a direction of an arrow A in FIG. 1, wherein when a ply cord located at a certain position along the circumference of the bead portion 1 is $5C_1$, a part of the ply cord 5C on and after a ply cord $5C_n$ at n-th position is illustrated. The ply cord $5C_n$ extends from a bead core 4 (not shown) of one of the bead portions 1 to a bead core 4 (outer bead core 4o in the illustrated embodiment) of the other bead portion 1 and is returned at the position of the bead core 4o (side face position at the outside of the tire in the embodiment of FIG. 2) at a given interval in an extending direction of the bead core 4o and extends toward the bead core (not shown) of the bead portion 1 as a ply cord $5C_{n+1}$. The ply cord $5C_{n+1}$ is returned at the bead core 4 (not shown) of the bead portion 1 in the same manner as mentioned above and again extends toward the side face position of the outer bead core 4o of the bead portion as a ply cord $5C_{n+2}$. The ply cord $5C_{n+2}$ is again returned at this position and extends toward the bead core 4 (not shown) as a ply cord $5C_{n+3}$. Such a round trip is successively repeated in the circumferential direction of the tire to form the ply cord 5C of the carcass 5 over a full circumference of the tire. Symbol E shown in FIG. 2 is a return end.

Thus, each of the bead portions 1 has roundtrip return portions 5Cu of the ply cord 5C of the carcass 5 (see FIGS. 3–8). Moreover, the roundtrip return portion 5Cu means a portion of the ply cord 5C ranging from a position adjacent to the bead core 4 (4i or 4o) up to the return end E in the turning from forward path to backward path.

At least one of the two bead cores 4i, 4o, more concretely a bead core covered with the ply cord 5C of the carcass 5 from an inside in the radial direction of the tire is formed so as to have such a structure that a single steel wire Sw is arranged lengthwise and widthwise in radial and widthwise directions of the tire plural times as shown in FIGS. 3–8. That is, the ply cord 5C of the carcass 5 has a return portion 5Cu located through a side face of the bead core having the lengthwise and widthwise arranged structure of the single steel wire Sw so as to cover at least steel wire Sw group in an innermost steel wire arrangement of the bead core in the radial direction from the inner side in the radial direction of the tire.

Each of FIGS. 3–8 shows an example that each of the two bead cores 4i, 4o has the lengthwise and widthwise arranged structure of the single steel wire Sw. Such a lengthwise and widthwise arranged structure of the single steel wire Sw in each of the bead cores 4i, 4o is formed by helically winding a single continuous steel wire Sw at a given row number (2 rows in each of the figures) side by side, and then helically winding at a given row number (2 rows in each of the figures) side by side thereon and repeating such a helical winding to form a given stage number (4 stages in each of the figures). Moreover, a plurality of single continuous steel wires Sw may be used, if necessary. In the formation of the bead core 4i, 4o, when the single steel wire Sw is required to have a tackiness, it is favorable that a very thin uncured rubber film is formed on the single steel wire Sw. As the single steel wire Sw, a piano wire having a circular section is suitable, a diameter of which is preferably within a range of 0.75–2.25 mm.

In case of a tubeless tire, a taper of a given angle is given to a bead base Bb of the tire (see FIGS. 3–8) and a rubber margin having a given size corresponding to a taper bead seat of an approved rim (a rim described in 1998 JATMA YEAR BOOK) is applied thereto so as to provide a function as a tubeless tire. As a result, the ply cord 5C of the carcass 5 covering the inside of at least one of the two bead cores in the radial direction of the tire as mentioned above is strongly sandwiched between the bead seat of the approved rim and the bead core 4i or 4o having the lengthwise and widthwise arranged structure of the single steel wire Sw, so that the ply cord 5C of the carcass 5 can sufficiently withstand to a pulling-out force applied from the bead core 4 (4i, 4o) to the ply cord 5C under an inflation of an internal pressure during the running under loading.

Therefore, the invention is most suitable for the tubeless tire.

Since the ply cord 5C of the carcass 5 has a roundtrip return portions in the circumferential direction of the bead portion as mentioned above, the ply member of the carcass 5 can be formed on a building drum in the building of an uncured tire, and hence the automatic building becomes naturally easy.

In FIGS. 3–8, the ply cord 5C of the carcass 5 is mainly shown and a coating rubber 5g for the ply cord 5C is partly shown. It is needless to say that the coating rubber 5g completely cover the ply cord 5C from the illustrated position to the return end E. Various embodiments on the roundtrip return portion 5Cu will be described more concretely with reference to FIGS. 3–8 below.

Figure 3:
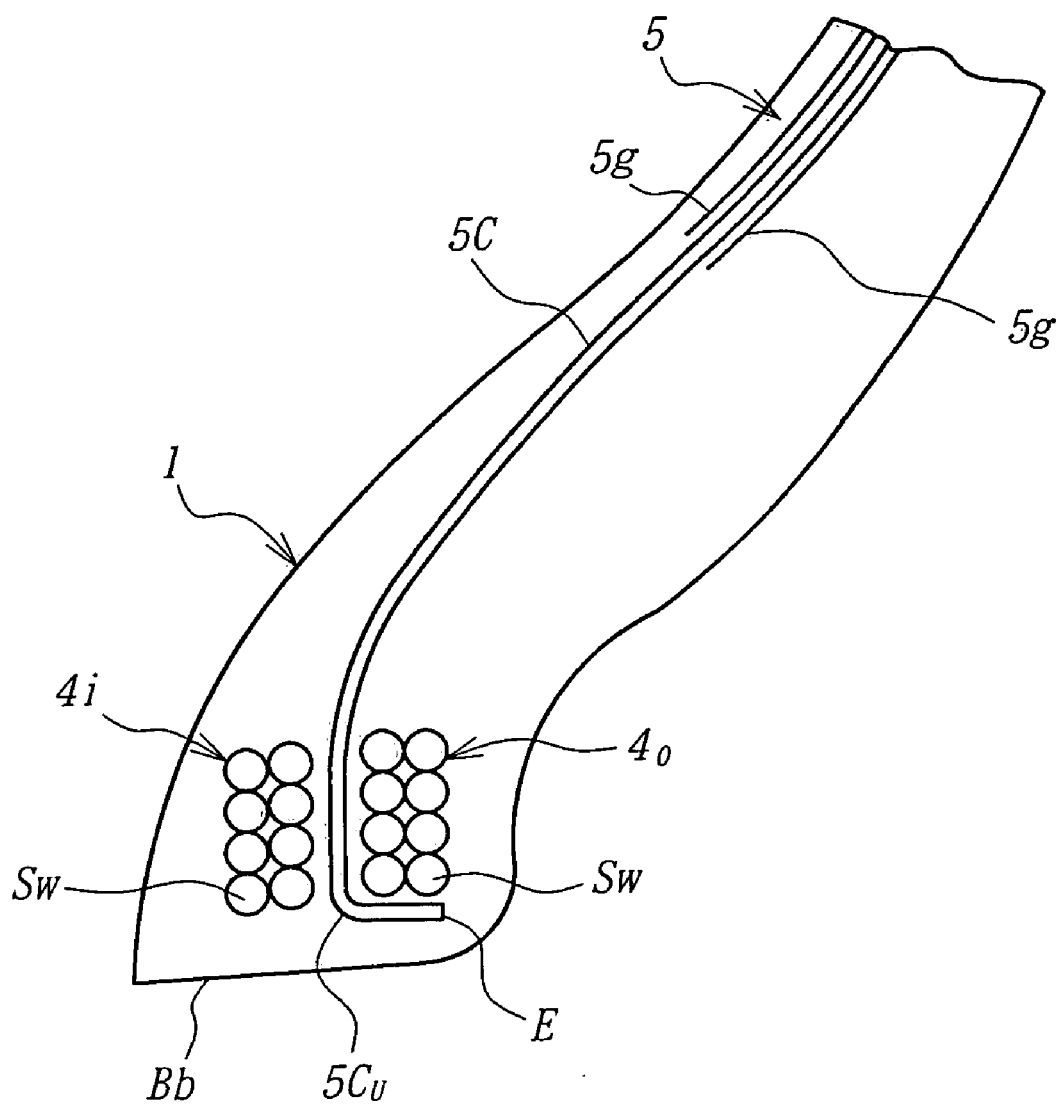
FIGS. 3 to 8 are diagrammatically section views of first to sixth embodiments of the bead portion according to the invention.

In the embodiment of FIG. 3, the bead portion 1 of the tire has a structure that the roundtrip return portion 5Cu of the ply cord 5C passed between the outer bead core 4o and the inner bead core 4i covers a group of steel wires Sw in an innermost steel wire arrangement of the outer bead core 4o in the radial direction of the tire and the return end E is stopped in a covering region.

Figure 4:
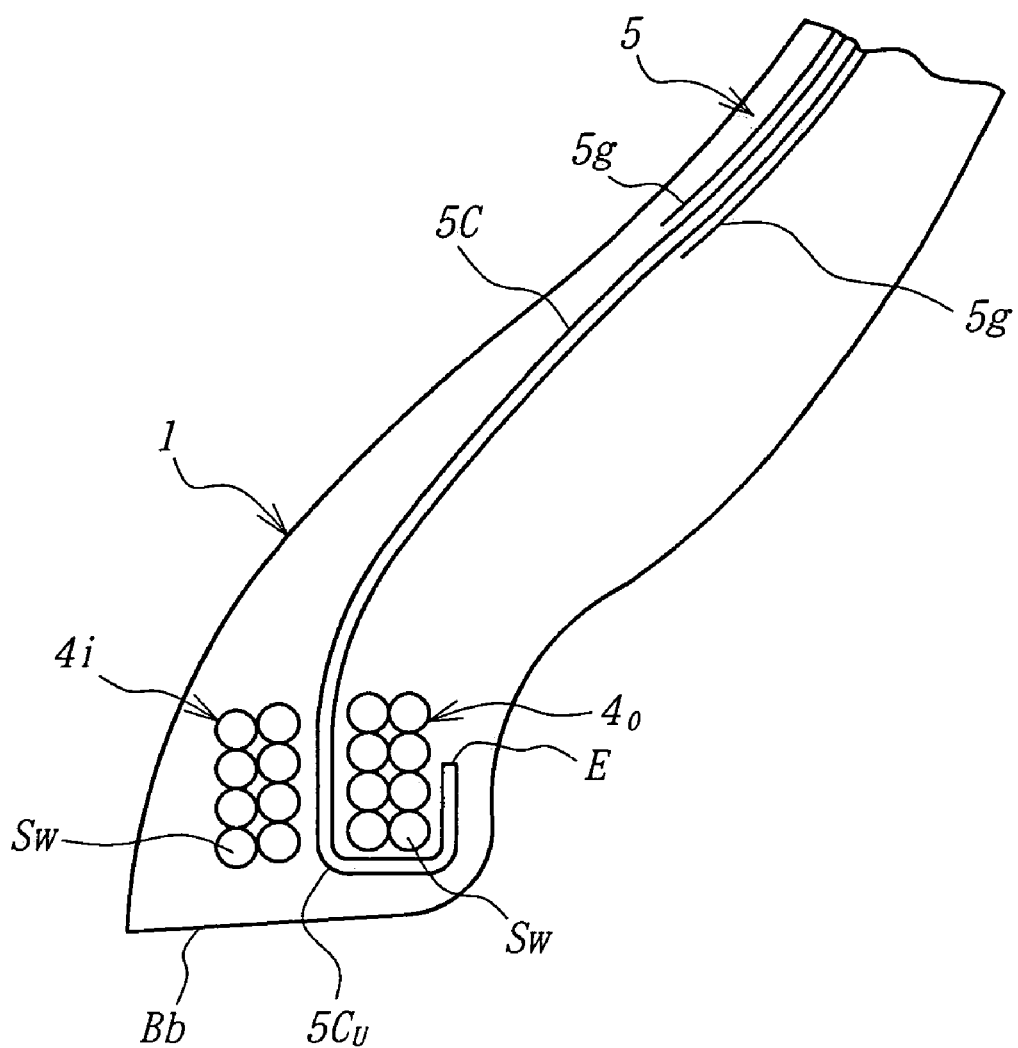
Figure 5:
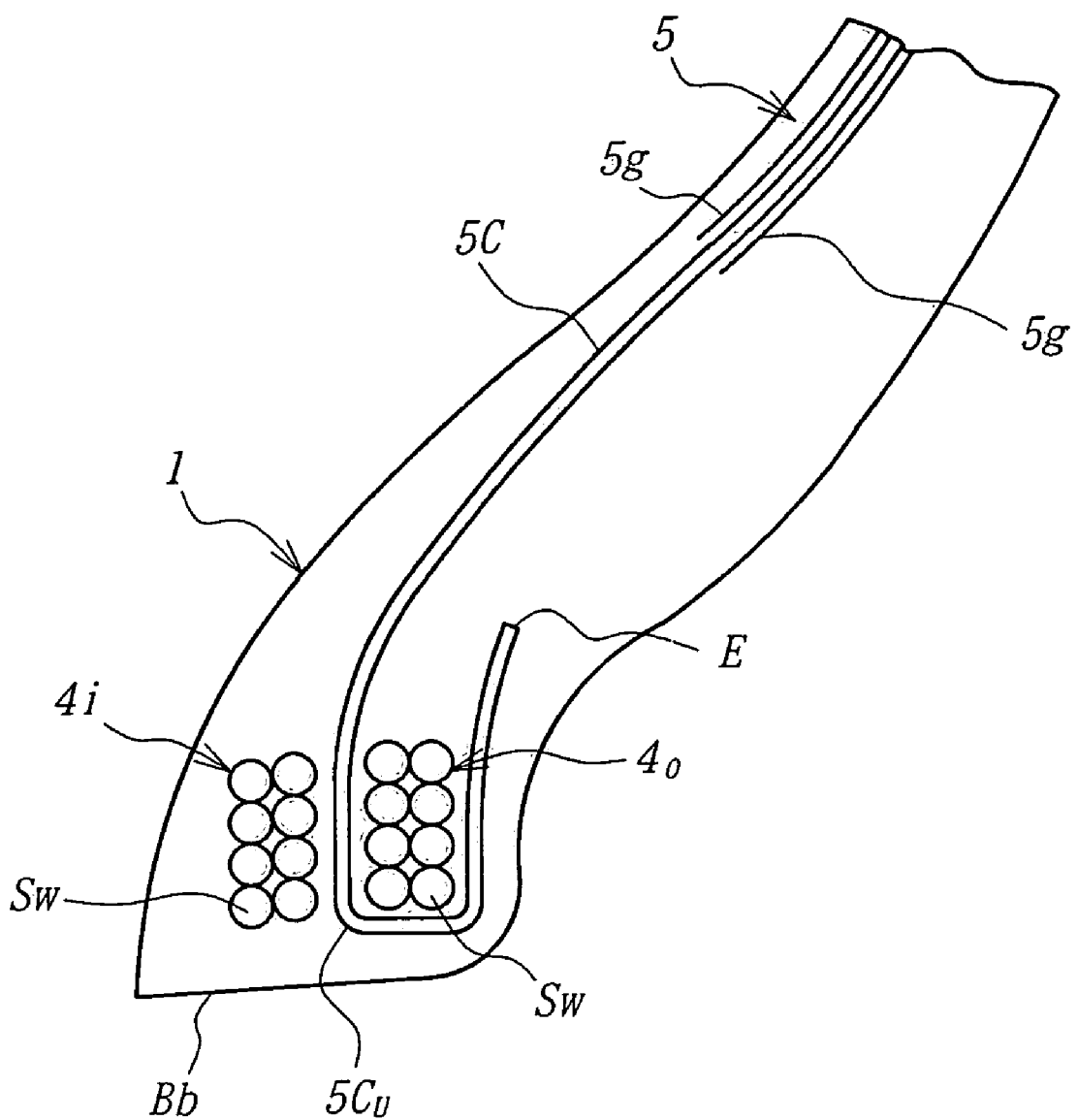

FIG. 4 is a modified embodiment of FIG. 3, wherein the return end E of the roundtrip return portion 5Cu is extended up to a halfway of an outer side face of the outer bead core 4o. That is, the roundtrip return portion forms a turnup portion wound around the outer bead core 4o from an inside of the tire toward an outside thereof in the radial direction. FIG. 5 is a modified embodiment of FIG. 4, wherein the return end E of the roundtrip return portion 5Cu is extended outward over the outer bead core 4o in the radial direction of the tire.

Figure 6:
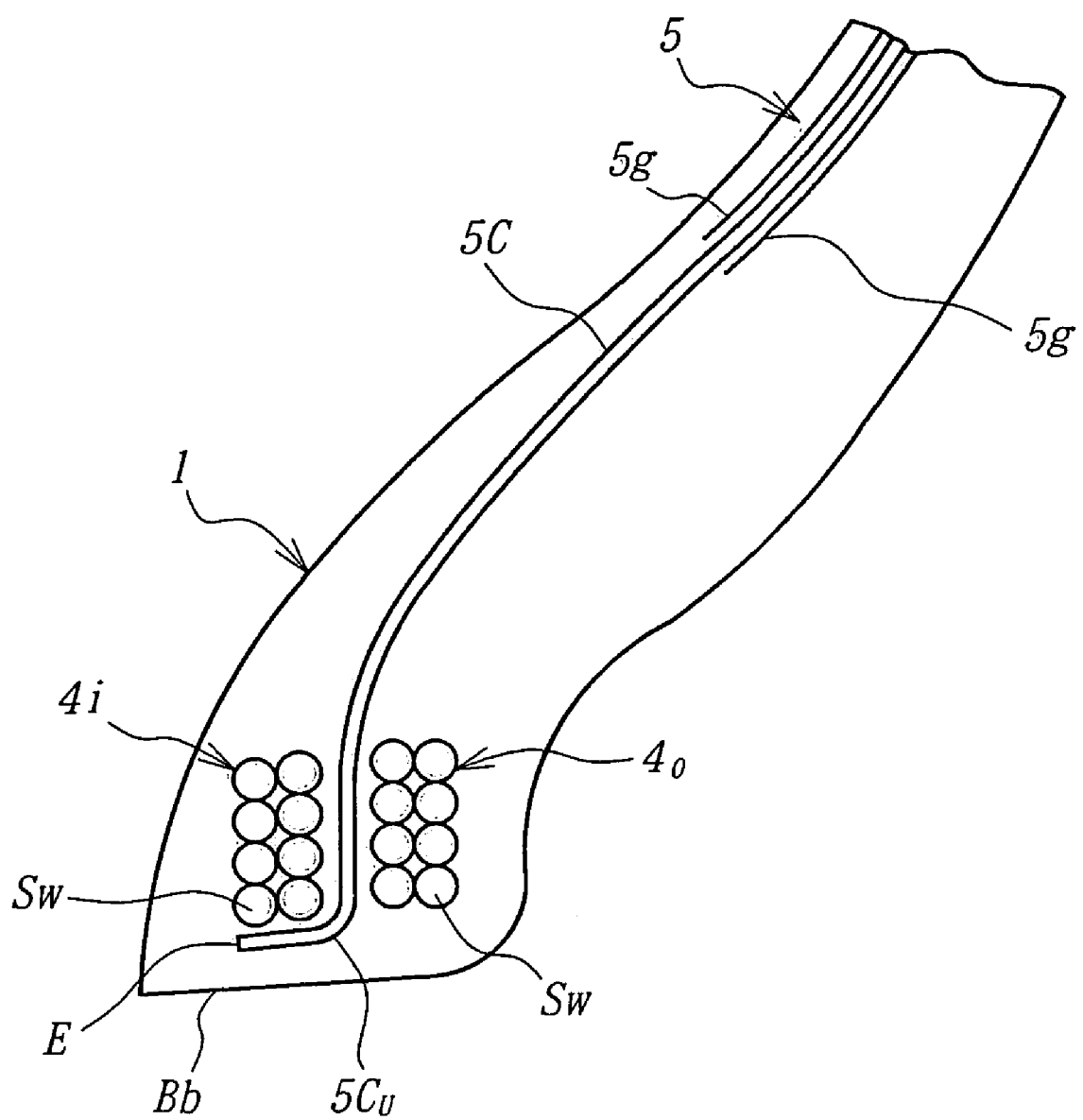

The embodiment of FIG. 6 is different from the embodiments of FIGS. 3–5, wherein the bead portion 1 of the tire has a structure that the roundtrip return portion 5Cu of the ply cord 5C passed between the outer bead core 4o and the inner bead core 4i covers a group of steel wires Sw in an innermost steel wire arrangement of the inner bead core 4i in the radial direction of the tire and the return end E is stopped in a covering region.

In all embodiments of FIGS. 3–6, the roundtrip return portion 5Cu is sandwiched between the inner bead core 4i and the outer bead core 4o in the bead portion 1.

Figure 7:
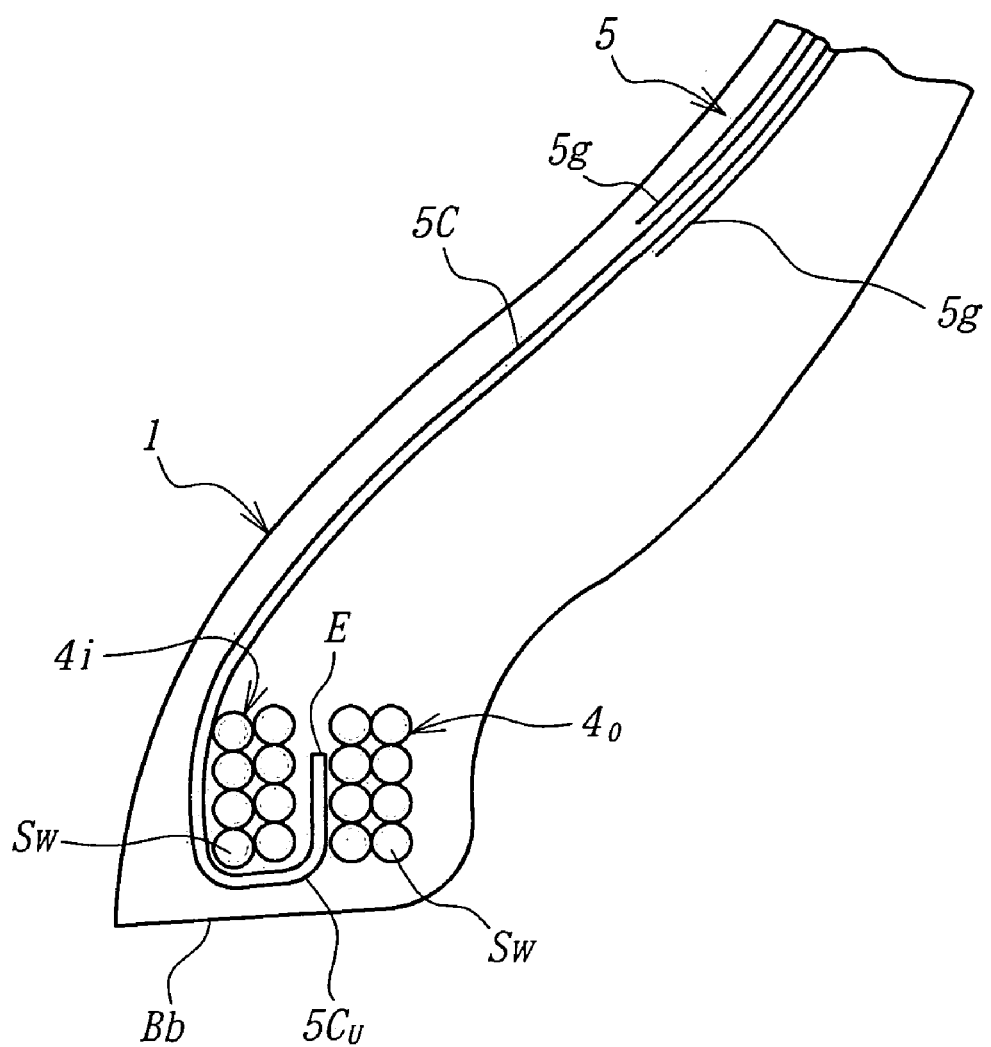
Figure 8:
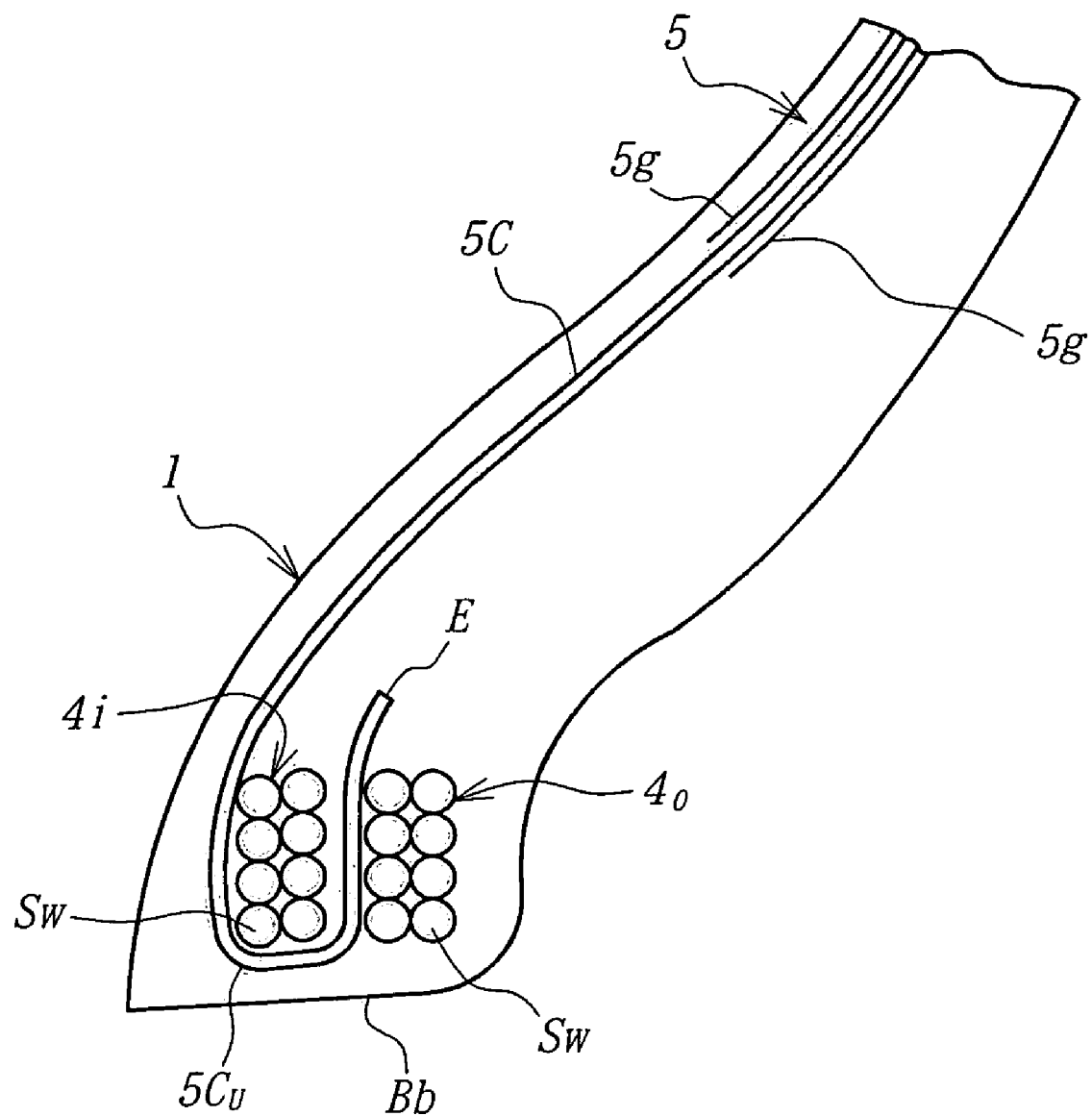

In the embodiments of FIGS. 7 and 8, the bead portion 1 of the tire has such a structure that the ply cord 5C is extended along an inner side face of an inner bead core 4i and wound around the inner bead core 4i from an inside of the tire toward an outside thereof in the radial direction to form a roundtrip return portion 5Cu, and the roundtrip return portion 5Cu is sandwiched between the inner bead core 4i and the outer bead core 4o. In FIG. 7, the return end E of the roundtrip return portion 5Cu is located between the inner bead core 4i and the outer bead core 4o. In FIG. 8, the return end E of the roundtrip return portion 5Cu is extended outward over the inner and outer bead cores 4i, 4o in the radial direction of the tire.

Figure 9:
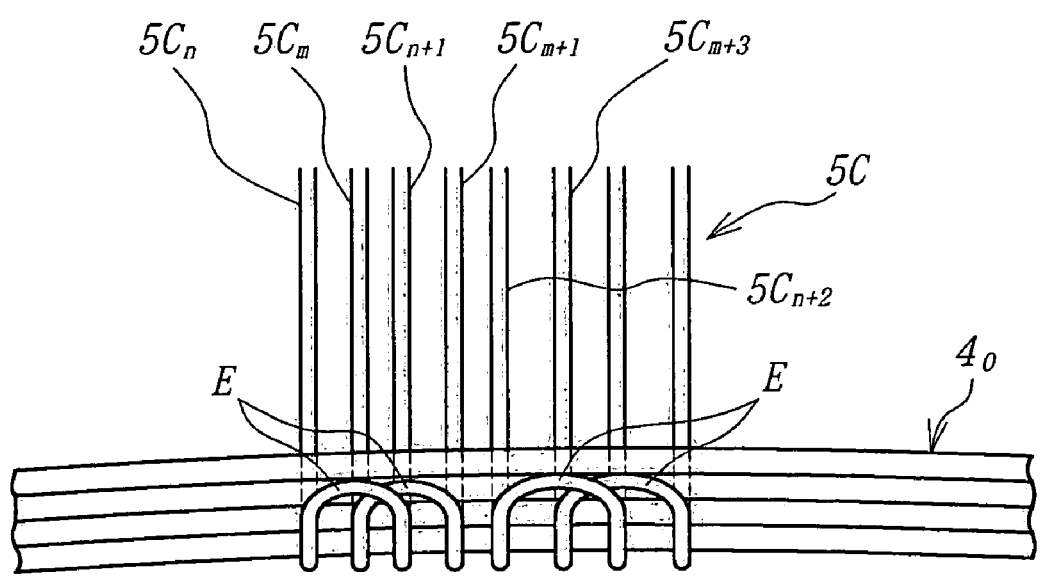
FIG. 9 is a side view of a main part in another embodiment of the pneumatic radial tire according to the invention.

In the carcass 5 shown in FIG. 2, the roundtrip return portion 5Cu of the ply cord 5C has a single terminal part aligned at a given pitch along the circumference of the bead portion 1. On the other hand, in the ply cord 5C of the carcass 5 shown in FIG. 9, the roundtrip return portion 5Cu forms double terminal parts overlapped with each other at a given pitch along the circumference of the bead portion 1. In the latter case, a ply cord $5C_m$ as a forward path is disposed between the ply cord $5C_n$ as a forward path and the ply cord $5C_{n+1}$ as a backward path and returned at the same given pitch as mentioned above to form a ply cord $5C_{m+1}$. The ply cord $5C_n$, $5C_{n+1}$ crosses with the ply cord $5C_m$, $5C_{m+1}$ in the vicinity of the return end E of the roundtrip return portion 5Cu. Although the double terminal parts are shown in FIG. 9, multi terminal parts may be formed. Moreover, the ply cord 5C having the multi terminal parts can be made by using a single continuous cord or by using two or more continuous cords.

Either or both of the inner bead core 4i and outer bead core 4o is not necessarily made of a single bead core and may be made of two or more bead cores.

The following examples are given in illustration of the invention and are not intended as limitations thereof.

There are provided three radial tires for passenger cars having a tire size of 195/65R14 and a structure shown in FIG. 1, wherein a carcass 5 is comprised of one cord ply containing polyester cords of 1500 D/2 therein as Examples 1–3. The bead portion 1 of the tire has a roundtrip return portion 5Cu of the ply cord 5C shown in FIG. 3 in Example 1, in FIG. 4 in Example 2, and in FIG. 5 in Example 3, respectively. A single steel wire Sw constituting a bead core 4 (comprised of inner bead core 4i and outer bead core 4o) is a piano wire having a diameter of 0.96 mm. For a comparison, a conventional tire has the same structure as in the tires of Examples 1–3 except that the return end E of the roundtrip return portion 5Cu is located between the inner bead core 4i and the outer bead core 4o.

With respect to the tires of Examples 1–3 and the conventional example, a test for bead portion durability is carried out under a condition of causing troubles in the bead portion. When the durability is represented by an index on the basis that the conventional example is 100, the index values of the durability in Examples 1–3 are 110~114 (the larger the index value, the better the durability). Moreover, the trouble caused in the conventional example results from the pulling-out of the carcass ply cord, while the trouble caused in Examples 1–3 results from the breakage of the ply cord 5C in the carcass 5.

As mentioned above, according to the invention, the phenomenon of pulling out the carcass ply cord can be controlled while maintaining the carcass structure facilitating automatic building of an uncured tire. Therefore, the invention can provide a pneumatic radial tire capable of largely improving the bead portion durability by the above controlling effect.

What is claimed is:

1. A pneumatic radial tire comprising a radial carcass that extends between a pair of bead portions, each bead portion including two bead cores therein, and that reinforces a pair of sidewall portions and a tread portion, wherein the radial carcass is comprised of a rubberized ply of a continuous cord successively repeating round trip between the two bead cores of at least one of the bead portions along a circumference of the bead portion and a roundtrip return portion of the cord is existent in both the bead portions, in which the two bead cores in each of the bead portions are arranged adjacent to each other in a widthwise direction of the tire, and each of the two bead cores has such a rectangular structure that one or more steel wires are arranged lengthwise and widthwise in radial and widthwise directions of the tire, the roundtrip return portion of the carcass ply cord is located through a side face of any one of the two bead cores so as to extend in the widthwise direction from a first side of the tire toward a second side thereof and cover at least a radially innermost steel wire arrangement of the respective bead core, and the roundtrip return portion of the carcass ply cord has a terminal part extending along an outer side face of a bead core located outside in the widthwise direction of the tire.

2. A pneumatic radial tire according to claim 1, wherein the two bead cores in each bead portion are arranged adjacent to each other in the widthwise direction of the tire and the roundtrip return portion of the carcass ply cord is sandwiched between the two bead cores.

3. A pneumatic radial tire according to claim 1, wherein the roundtrip return portion of the carcass ply cord has a single terminal part aligned at a given pitch along the circumference of the bead portion.

4. A pneumatic radial tire according to claim 1, wherein the roundtrip return portion of the carcass ply cord has multiple terminal parts overlapped with each other at a given pitch along the circumference of the bead portion.

* * * * *